United States Patent

Ivy

[11] 3,893,713
[45] July 8, 1975

[54] PICK-UP TRUCK COUPLER FOR GOOSENECK BALL TRAILER HITCHES

[76] Inventor: Charles D. Ivy, Rt. 5, Box 243, Monroe, La. 71201

[22] Filed: June 28, 1974

[21] Appl. No.: 484,114

[52] U.S. Cl............... 280/511; 280/423; 280/415 B
[51] Int. Cl.² ......................................... B60D 1/06
[58] Field of Search ............ 280/433, 423, 511, 512

[56] References Cited
UNITED STATES PATENTS

| | | | |
|---|---|---|---|
| 1,272,486 | 7/1918 | McManis | 280/433 |
| 3,433,503 | 3/1969 | Davis | 280/512 |
| 3,574,363 | 4/1971 | Stephenson | 280/511 X |
| 3,650,546 | 3/1972 | Koenig | 280/512 |
| 3,659,876 | 5/1972 | Melton | 280/511 |
| 3,791,674 | 2/1974 | Berends | 280/423 R X |

*Primary Examiner*—Leo Friaglia
*Attorney, Agent, or Firm*—Raymond N. Matson

[57] ABSTRACT

An improved coupler mounted over the rear axle of a pick-up truck and recessed below the truck bed so as not to interfere with normal use thereof, and so arranged as to lockably receive the ball of the gooseneck hitch of a trailer.

2 Claims, 4 Drawing Figures

PICK-UP TRUCK COUPLER FOR GOOSENECK BALL TRAILER HITCHES

The present invention relates generally to couplers for trailer hitches and more particularly to couplers adapted to be used with the gooseneck type of hitch having a ball at its end.

Such trailer hitches and couplers therefor are very well known in the art and take many forms depending on their intended use.

Also, it is quite common for pick-up trucks to have such couplers whether of the one-half or one ton variety to enhance their versatility. However, most of these are mounted on the rear bumper to thus either limit the load that can be pulled or to damage the rear bumper. Even worse, some of the couplers are permanently mounted on top of the bed of the pick-up truck to thus severely limit their basic function.

Accordingly, the main object of the present invention is to provide an improved coupler which may be economically mounted on pick-up trucks without limiting their normal functions or causing damage thereto.

Another important object of the present invention is to provide an improved coupler of the type described which may be readily installed on the vehicle bed.

A further important object of the present invention is to provide an improved coupler for pick-up trucks which is economical in cost and of long life in use.

Other objects and advantages of the present invention will become apparent during the course of the following description.

In the drawings, I have shown one embodiment of the invention. In this showing:

Figure 1:
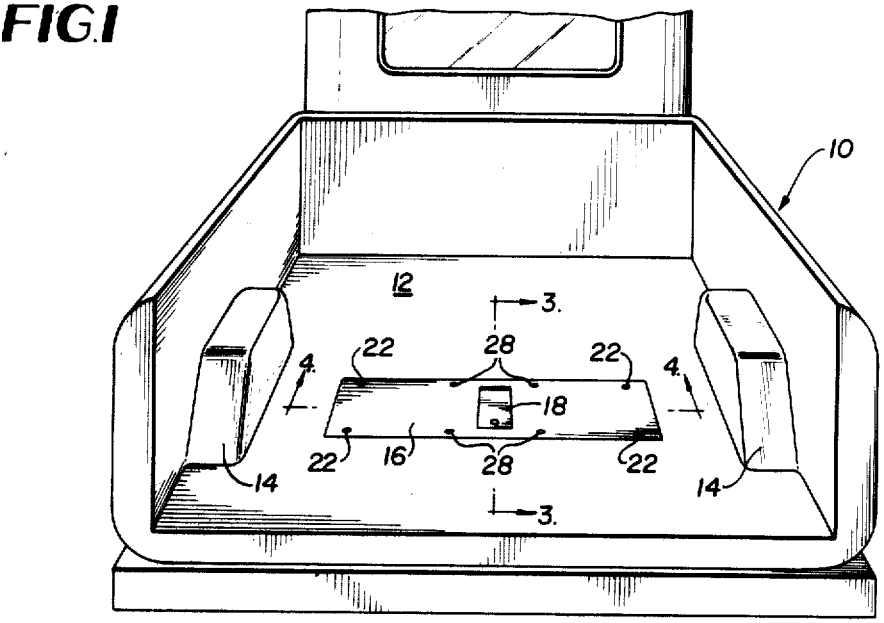
FIG. 1 is a rear perspective view showing the novel coupling comprising the present invention installed on the floor of a pick-up truck between the rear wheels.

Referring to the drawings, numeral 10 designates a pick-up truck as a whole having a load carrying truck bed 12 and showing the present invention installed between the rear wheel housings 14 and over the rear axle.

Figure 2:
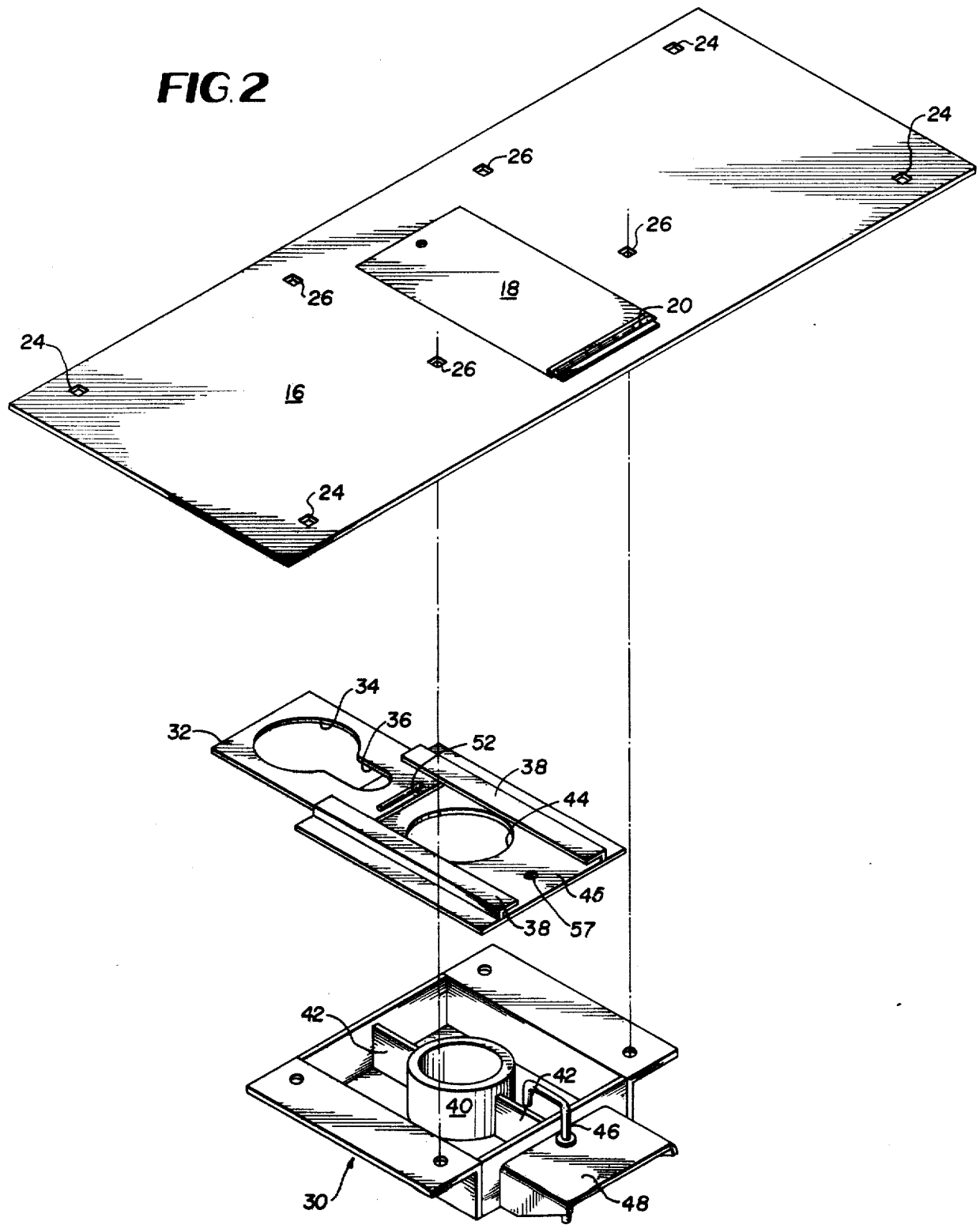
FIG. 2 is a perspective exploded view of the present invention to an enlarged scale.

The invention (FIG. 2) comprises a rectangular bed plate 16 which conveniently may be 42 inch × 16 inch × ¼ inch having an access door 18 which may be pivoted open by means of a piano hinge 20. A rectangular opening is cut out of the truck bed 12 over the rear axle and four holes are drilled therein for the reception of carriage bolts 22 projecting downwardly through holes 24 formed in the bed plate 16 and through the frame of the truck.

Four additional holes are drilled in the truck bed 12 in line with the holes 26 for bolts 28 which support the ball socket housing 30. The latter includes a lock plate 32 having a large opening 34 and a smaller locking opening 36 and is guided by members 38 welded to the apertured plate of the socket housing 30. The ball socket 40 is of ½ inch wall pipe and is braced in the direction of stress by a brace 42, and is in alignment with the aperture 44 of the plate 45 which, as stated is welded to the top of the housing 30.

Figure 3:
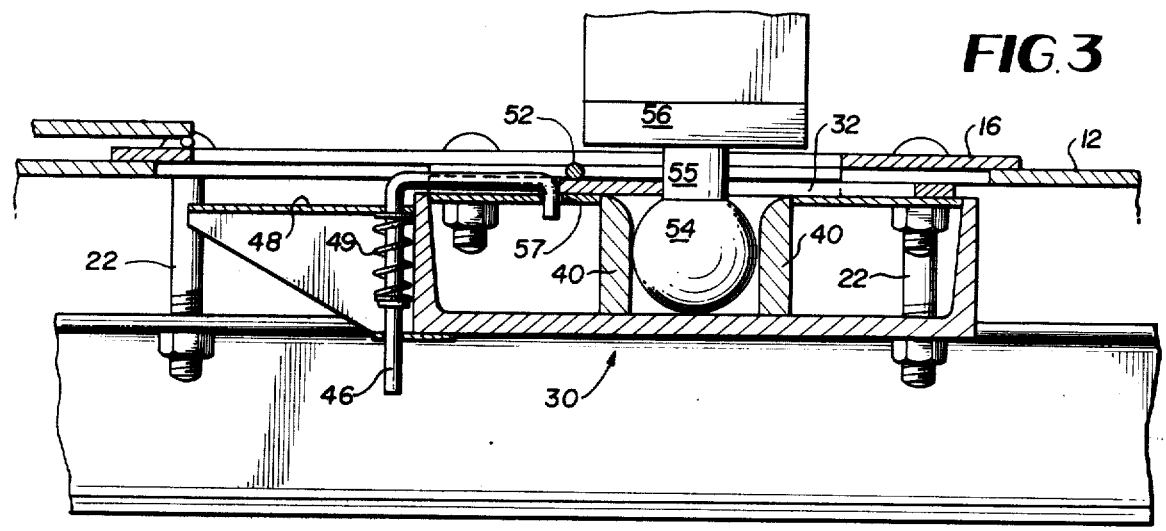
FIG. 3 is a vertical longitudinal sectional view.

A 16 guage metal plate 48 (FIGS. 2 and 3) is welded to the housing 30 to support electrical and brake receptacles and includes a ball lock plate latch 46 which is provided with a spring 49 to retain its outer end in a hole 57 after being moved to locking position by an elongated projection 52 in the lock plate 32 when the coupler 30 is in use.

Figure 4:
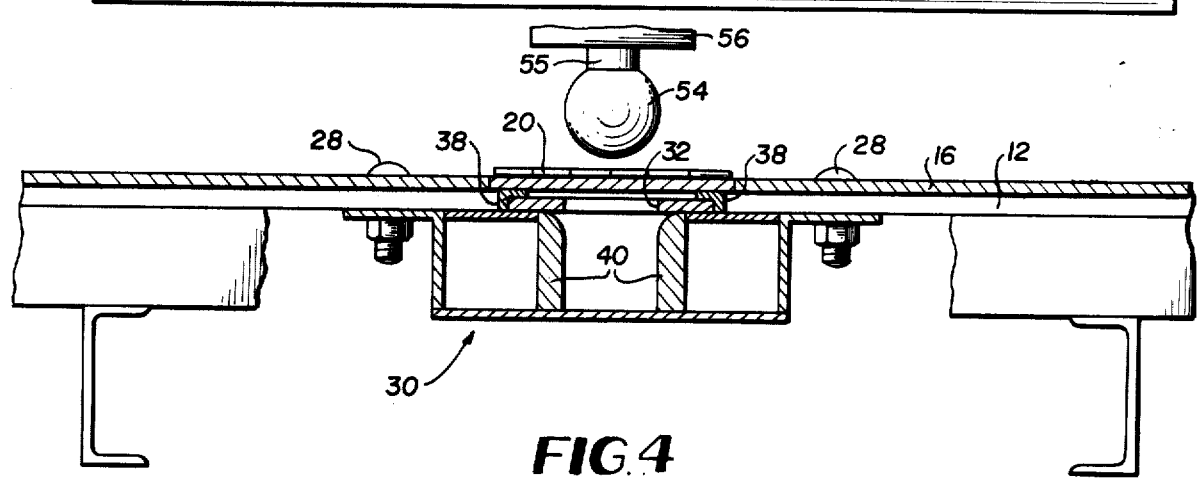
FIG. 4 is a vertical transverse sectional view thereof.

The ball 54 at the end of a gooseneck type of trailer hitch 56 (FIGS. 2, 3 and 4) is readily and securely coupled to the coupler 30. The lock plate 32 is first moved so that the large opening 34 is in alignment with the aperture 44 and the ball 54 is then inserted therethrough into the ball socket 40. The lock plate 32 is now moved so that the small lock plate opening 36 engages the neck 55 of the ball 54 thereby preventing its retraction. The latch 46 which has been turned sideways to permit the foregoing, is now turned back to center position and its outer end is forced by the spring 48 into the locking hole 57 of the lock plate 32.

It is to be understood that the form of the invention herewith shown and described is to be taken as a preferred example of the same and that various changes in the shape, size and arrangement of parts may be resorted to without departure from the spirit of the invention or the scope of the subjoined claims.

What is claimed is:

1. The combination with the load carrying bed of a truck having an opening formed in said bed over the rear axle thereof; of a bed plate covering said opening and fixed to said bed; said plate having a trailer hitch ball receiving coupler fixed to the bottom of the central area thereof and an access door formed therein; said coupler having a horizontally extending plate with a ball receiving opening therein; longitudinally extending guide members mounted on opposite sides of said opening; said plate including a lock receiving aperture; a planar horizontally moving locking slide movable in said guide members and having a key hole slot including a large opening for the reception of said ball and a smaller opening for engaging the neck of said ball to lock it in said coupler; and locking means connectable with said lock receiving aperture.

2. The combination recited in claim 1; and resilient means for holding said locking means in locking position.

* * * * *